United States Patent [19]

Nishikawa et al.

[11] Patent Number: 4,826,239
[45] Date of Patent: May 2, 1989

[54] T-BAR ROOF

[75] Inventors: Kazuhiro Nishikawa, Toyota; Masakatsu Kikuchi, Anjyo; Masuo Shimomura, Nagoya, all of Japan

[73] Assignee: Aisin Seiki Kabushiki Kaisha, Kariya, Japan

[21] Appl. No.: 82,192

[22] Filed: Aug. 6, 1987

[30] Foreign Application Priority Data

Aug. 22, 1986 [JP] Japan .................................. 61-196670

[51] Int. Cl.⁴ ................................................ B60J 7/11
[52] U.S. Cl. ..................................... 296/218; 296/201
[58] Field of Search ................ 296/84 A, 84 D, 93, 296/201, 218; 156/307.3, 324.4; 248/467

[56] References Cited

U.S. PATENT DOCUMENTS

| 3,747,773 | 7/1973 | Jackson | 156/291 X |
| 4,051,286 | 9/1977 | Abbott | 156/295 X |
| 4,121,870 | 10/1978 | Oakey | 296/218 X |
| 4,405,175 | 9/1983 | Hoffman | 296/93 X |

FOREIGN PATENT DOCUMENTS

| 142445 | 12/1978 | Japan | 156/324.4 |
| 1336882 | 11/1973 | United Kingdom | 156/307.3 |
| 2106050 | 4/1983 | United Kingdom | 296/218 |

Primary Examiner—Dennis H. Pedder
Attorney, Agent, or Firm—Finnegan, Henderson, Farabow, Garrett & Dunner

[57] ABSTRACT

A T-bar roof wherein a bracket is secured to one edge of a glass window using a bolt and a urethane resin adhesive and the bracket is detachably disposed on a roof frame of an automotive vehicle. A quick-drying adhesive is applied to the area between the bracket and the glass window so as to temporarily secure these two members. Thus, it is possible to transport or mount the window glass on a vehicle without waiting for the urethane resin adhesive to set.

6 Claims, 5 Drawing Sheets

T-BAR ROOF

BACKGROUND OF THE INVENTION

1. Field of the Invention:

The present invention relates to a T-bar roof and, more particularly, to an improvement in means for securing together a window glass and a bracket used in a T-bar roof.

2. Description of the Prior Art:

With reference first to FIG. 5, a typical conventional T-bar roof 1 has a structure in which a pair of window glasses 3 are fitted in respective openings provided in a roof 2 of an automotive vehicle. Each window glass 3 has a bracket 4 secured to one edge thereof, and stretchable pins 5 are disposed at two axial ends, respectively, of the bracket 4. Thus, the window glass 3 can be fitted in the opening in the roof 2 by engaging the pins 5 with a roof frame 6 of the vehicle, and removed from the opening by disengaging the pins 5 from the roof frame 6.

Referring next to FIG. 6, which shows the relationship between the window glass 3 and the bracket 4, one lateral end portion of the glass 3 is rounded so as to conform with the external appearance of the vehicle, and the bracket 4 has the same radius of curvature as that of the window glass 3. The bracket 4 has a gutter portion 7 and a seal member 8 at its outer end. The bracket 4 and the window glass 3 are secured to each other using a urethane resin adhesive 9 and they are tightened by means of bolts 10 so as to be maintained in the secured state. Reference numeral 11 denotes a sealing member.

The above-described prior art suffers from certain disadvantages.

Specifically, since the window glasses 3 involve a considerably large error in terms of their manufacture, it is necessary to employ a jig in order to adjust the position of the bracket 4 relative to the roof frame 6 so that the window glass 3 is flush with the outer surface of the vehicle.

The urethane resin adhesive 9 which is used to secure the window glass 3 and the bracket 4 to each other takes a long time to set. Generally, the setting time of this type of adhesive is about 168 hours, and at least 24 hours is required to complete the securing operation. Accordingly, it is common practice to secure both the glass window 3 and the bracket 4 to the jig and allow them to stand for 24 hours or place them in a humidifying oven in order to shorten the setting time. However, the former means requires space, while the latter means necessitates costly equipment, namely a heating oven.

SUMMARY OF THE INVENTION

Accordingly, an object of the present invention is to provide a novel T-bar roof which is free from the above-described disadvantages of the prior art.

According to the present invention, the foregoing object is attained by providing a T-bar roof wherein a quick-drying adhesive is applied to the area between the window glass and the bracket in addition to the above-described urethane resin adhesive and bolts.

Examples of quick-drying adhesives which can be employed in the present invention include hot melts (commercially available from Sumitomo 3M Ltd. and Yokahama Rubber Co., Ltd.).

The quick-drying adhesive employed in the present invention sets within about 5 minutes and is therefore effectively used to temporarily secure the window glass and the bracket to each other. Accordingly, even if the jig is removed from the window glass and the bracket after they have been temporarily secured, there will be no change in the relative position of the two members, and it is therefore possible to transport or mount the window glass on a vehicle without waiting for the glass window and the bracket to be secured to each other by means of the urethane resin adhesive. It should be noted that when 24 hours has passed, the urethane resin adhesive cures to increase the strength at which the window glass and bracket are secured to each other.

The above and other objects, features and advantages of the present invention will become more apparent from the following description of the preferred embodiments thereof, taken in conjunction with the accompanying drawings.

DESCRIPTION OF THE PREFERRED EMBODIMENT

Figure 4:
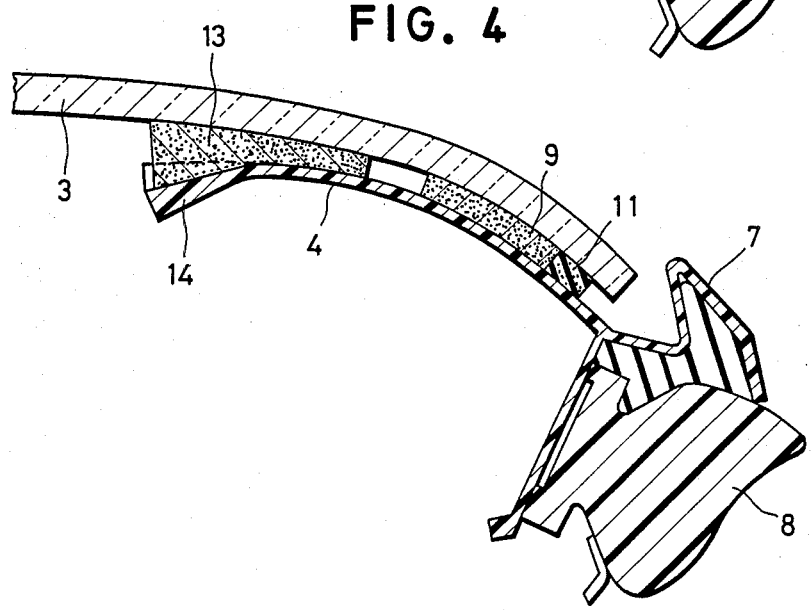
FIG. 4 is a fragmentary sectional view of the arrangement shown in FIG. 3.
Figure 5:
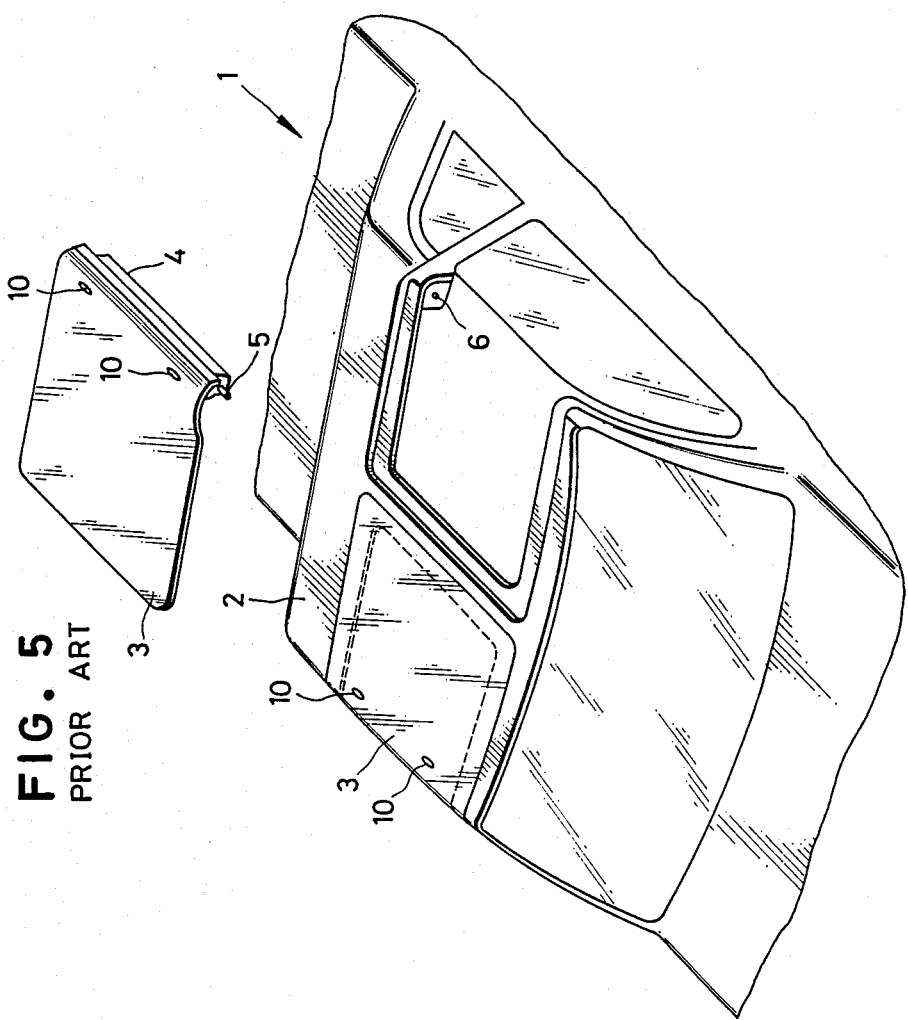
FIG. 5 is a perspective view of a conventional T-bar roof.
Figure 6:
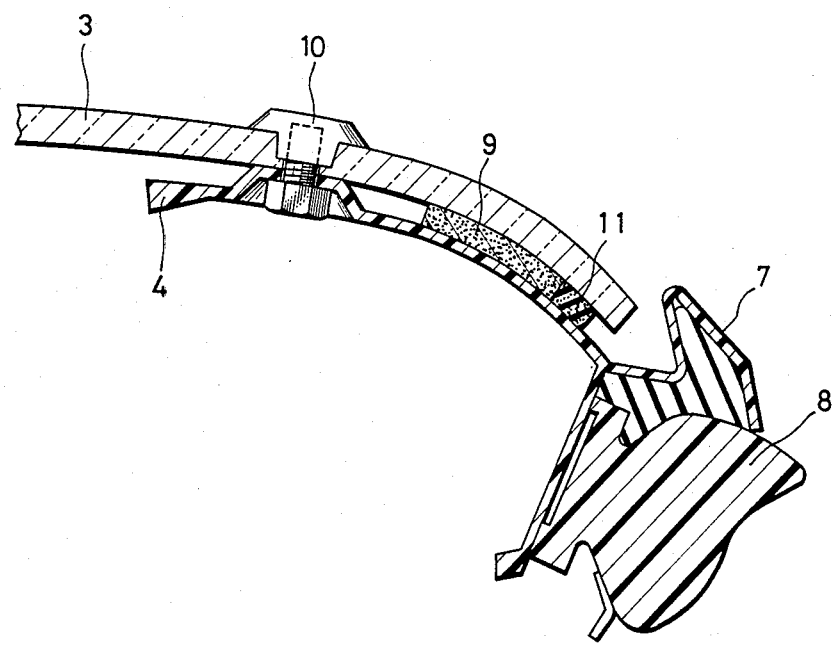
FIG. 6 is a fragmentary sectional view of a combination of a window glass and a bracket in the conventional T-bar roof.

Preferred embodiments of the present invention will be described hereunder in detail with reference to FIGS. 1 to 4, in which the same members or portions as those shown in FIGS. 5 and 6 are denoted by the same reference numerals and a description thereof will be partially omitted.

Figure 1:
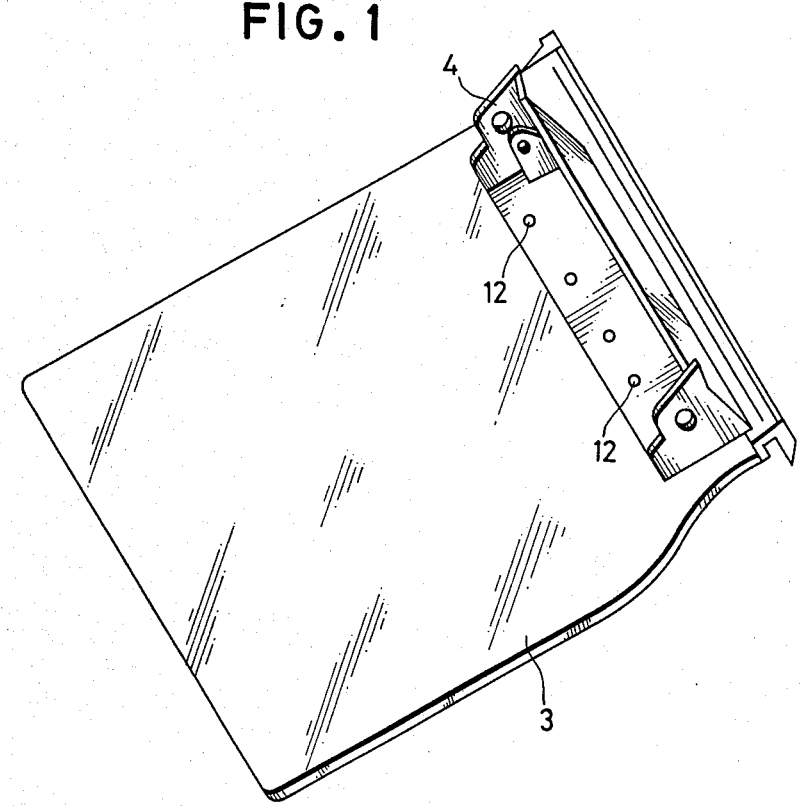
FIG. 1 is a perspective view of a combination of a window glass and a bracket in accordance with one embodiment of the present invention.
Figure 2:
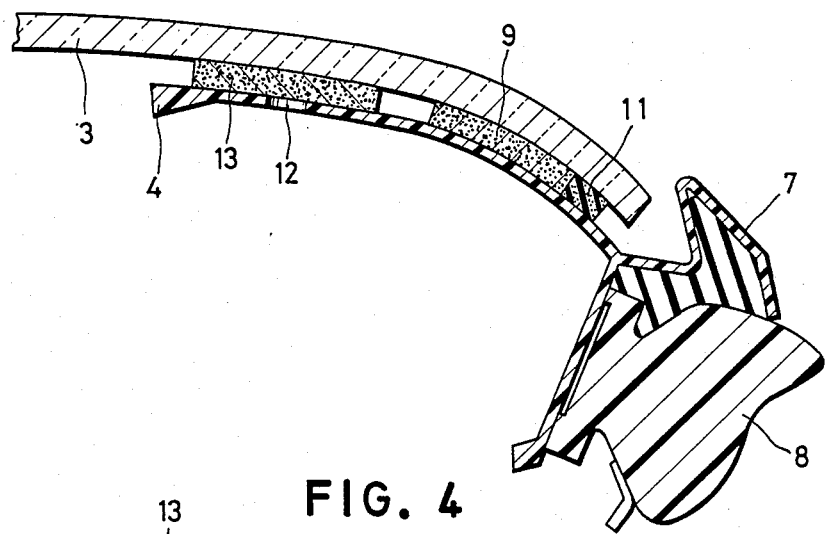
FIG. 2 is a fragmentary sectional view of the arrangement shown in FIG. 1.

Referring first to FIGS. 1 and 2, which show in combination one embodiment of the present invention, the bracket 4 has a plurality of holes 12 which are spaced apart from each other. After the window glass 3 and the bracket 4 have been secured to each other using the urethane resin adhesive 9 and the bolts 10 and by employing a jig, a quick-drying adhesive 13 is injected into the area between the window glass 3 and the bracket 4 through the holes 12. As the quick-drying adhesive 13, a hot melt (commercially available from Sumitomo 3M Ltd. and Yokohama Rubber Co., Ltd.) is preferably employed. The adhesive 13 sets within about 5 minutes to temporarily secure the window glass 3 and the bracket 4 to each other, thus enabling the window glass 3 to be transported or mounted on a vehicle without waiting for the glass 3 and the bracket 4 to be secured to each other by means of the urethane resin adhesive.

Figure 3:
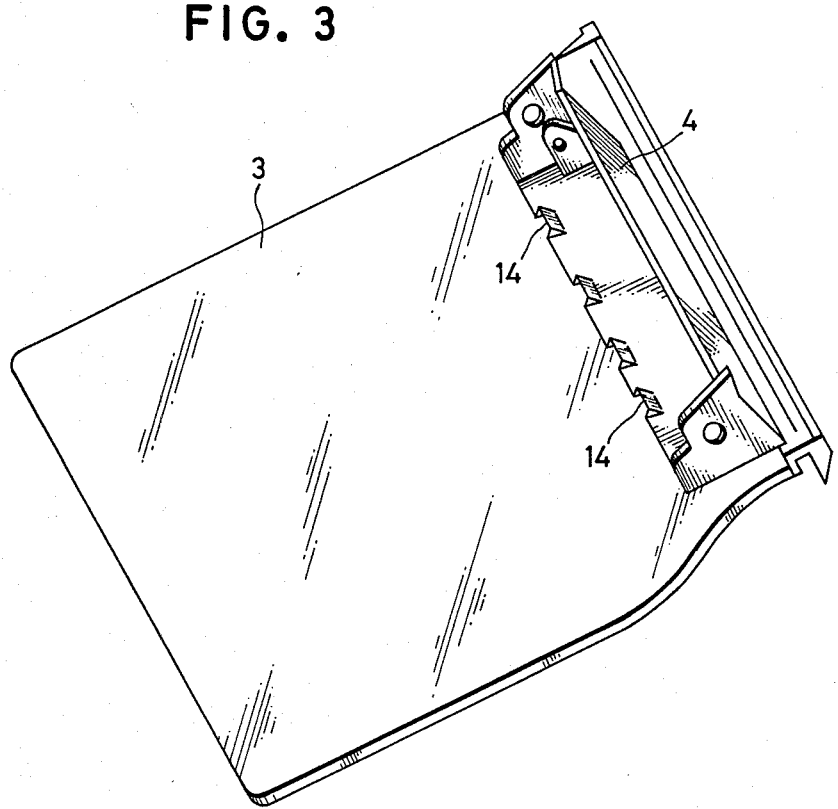
FIG. 3 is a perspective view of a combination of a window glass and a bracket in accordance with another embodiment of the present invention.

According to another embodiment of the present invention shown in FIGS. 3 and 4, a plurality of raised portions 14 are provided so as to be spaced apart from each other along the inner edge of the bracket 4, and the quick-drying adhesive 13 is injected into the area between the window glass 3 and the bracket 4 from relatively large openings which are defined by the raised portions 14, respectively. The adhesive 13 in this embodiment functions in the same way as in the first embodiment.

If the window glass and the bracket are secured to each other using only a quick-drying adhesive such as that employed in the present invention, durability may be inadequate and the costs are high. In the present invention, however, a quick-drying adhesive is used in combination with a urethane resin adhesive; therefore, the T-bar roof according to the present invention is free from such disadvantages. In addition, the combination of a quick-drying adhesive and a urethane resin adhesive is convenient in comparison with a two-pack type urethane resin adhesive prepared so as to shorten the setting time.

As many apparently widely different embodiments of the present invention can be made without departing from the spirit and scope thereof, it is to be understood that the invention is not limited to the specific embodiments thereof except as defined in the appended claims.

What we claim is:

1. A window assembly for a T-bar roof comprising:
   a window glass having a surface extending between an inner edge and an outer edge;
   a bracket adapted to be detachably disposed on a roof frame of a vehicle, said bracket having a first surface portion facing said window glass and extending between an inner edge and an outer edge, said first surface portion outer edge overlapping said outer edge of the glass, said first surface portion and a portion of the surface of the window glass being disposed substantially parallel to each other and spaced from each other a first distance, said bracket having at least one second surface portion facing the surface of said window glass and diverging therefrom at said first surface portion inner edge, said second surface portion being spaced from the surface of the glass a second distance greater than said first distance;
   a seal disposed between said window glass and said bracket at said outer edge of said window glass and said outer edge of said first surface portion;
   a first region between said window glass and said bracket for securing the window glass to the bracket by means of a urethane-resin adhesive having a first drying time; and
   a second region between said window glass and said bracket for securing the window glass to the bracket by means of an adhesive having a second drying time that is substantially less than said first drying time, said second region being disposed along a portion of said second surface portion.

2. The window assembly of claim 1, wherein said at least one second surface portion extends from a point spaced from the first surface portion inner edge to a second surface portion edge, said at least one second surface portion edge being parallel to said first surface portion inner edge.

3. The window assembly of claim 1, wherein said at least one second surface portion includes a plurality of tabs spaced along said first surface portion inner edge.

4. The window assembly of claim 2, wherein said al least one second surface portion includes a plurality of tabs spaced along said first surface portion inner edge and diverging from said point spaced from said first surface portion inner edge to said second surface portion edge.

5. The window assembly of claim 1, wherein said second distance is progressively greater as the second surface portion extends from one end adjacent the outer edge of the bracket to another end adjacent the inner edge of the bracket.

6. The window assembly of claim 1, wherein said second surface portion extends at an angle relative to the first surface portion.

* * * * *